United States Patent [19]  [11] 3,996,689
Lawless  [45] Dec. 14, 1976

[54] SNAGLESS SINKER SYSTEM
[76] Inventor: Earl E. Lawless, P.O. Box 472, Georgetown, Calif. 95634
[22] Filed: Oct. 3, 1975
[21] Appl. No.: 619,552
[52] U.S. Cl. .............................................. 43/44.97
[51] Int. Cl.² ....................................... A01K 95/00
[58] Field of Search ............ 43/44.97, 44.96, 42.1, 43/42.4, 42.41, 42.42, 43.2, 43.4, 43.1, 43.15, 42.74

[56] References Cited
UNITED STATES PATENTS

| 2,663,111 | 12/1953 | Hollingsworth | 43/42.4 |
| 3,667,151 | 6/1972 | Lamb | 43/44.97 |
| 3,750,321 | 8/1973 | McClellan | 43/42.1 |

Primary Examiner—Warner H. Camp
Attorney, Agent, or Firm—Townsend and Townsend

[57] ABSTRACT

Apparatus for reducing the likelihood that a sinker or other weighting device on a fishing line will become snagged on underwater obstructions includes a hollow receptacle having a cross-section much larger than the cross-section of the sinker. A relatively small aperture is provided in the leading portion of the receptacle, and a large aperture is provided in the trailing end. The fishing line passes through the small aperture in the receptacle to engage the sinker which is inserted into the receptacle through the large aperture. A plurality of elongate, flexible, resilient whiskers project outwardly from the leading portion of the receptacle. The whiskers fend the receptacle off of the underwater obstacles, and the large size of the receptacle minimizes the chances that it will become snagged on such obstacles.

8 Claims, 4 Drawing Figures

U.S. Patent  Dec. 14, 1976  3,996,689
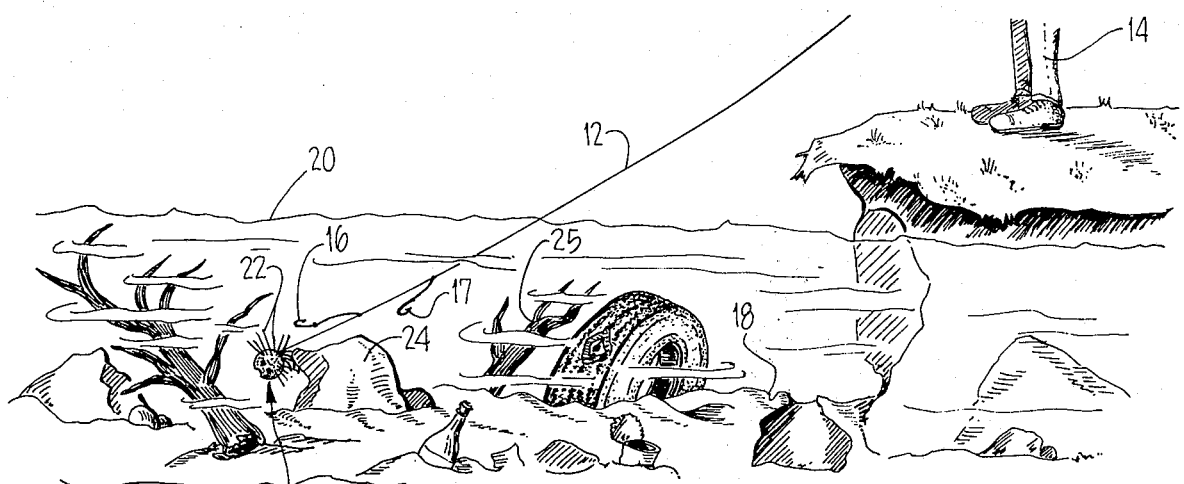
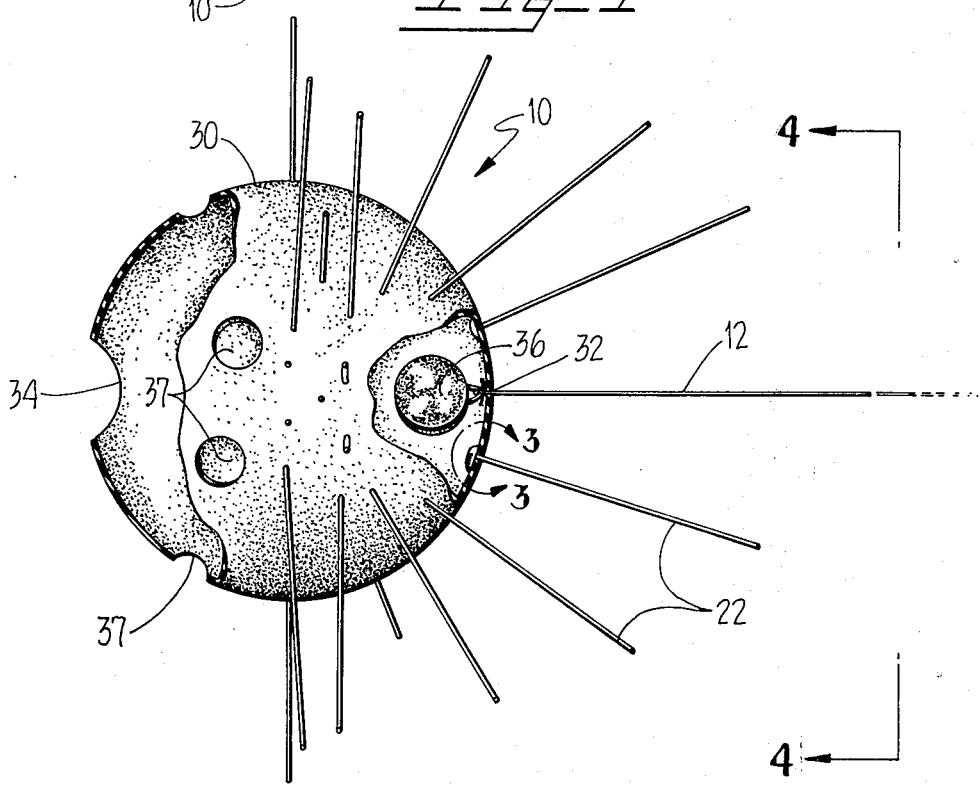
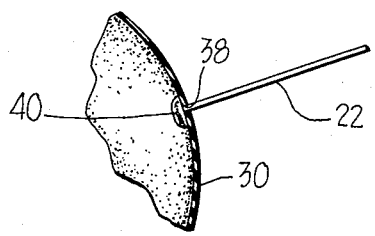
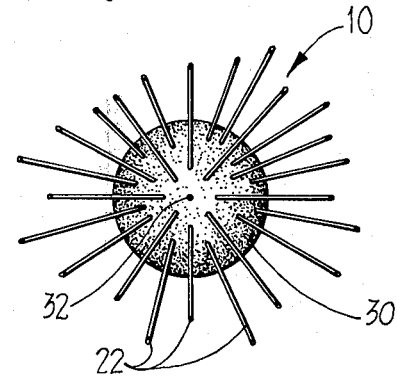

SNAGLESS SINKER SYSTEM

BACKGROUND OF THE INVENTION

The present invention relates to apparatus for reducing the likelihood that a sinker or other weighting device on a fishing line will become snagged on underwater obstructions.

In many types of fishing, the fish are found very near the bottom of a lake or stream. In order to catch such fish, it is necessary that the bait or lure be trolled just off the bottom so that the bait or lure passes through the area occupied by the fish. Accordingly, the usual practice is to attach a sinker to the fishing line in a position spaced somewhat from the bait or lure so that the bait or lure moves slightly above the bottom and through the area occupied by the fish. This method has proved to be quite effective, but the sinker often becomes snagged on various obstructions on the bottom, such as branches, rocks and the like. When the sinker cannot be manually disengaged, it is usually lost, together with the bait and lures of the line to which the sinker is attached.

SUMMARY OF THE INVENTION

The present invention provides apparatus for reducing the likelihood that a sinker or other weighting device on a fishing line will become snagged on underwater obstructions. The apparatus includes a hollow receptacle having a cross-section much larger than the cross-section of the sinker. A relatively small aperture is provided in the leading portion of the receptacle, and a large aperture is provided in the trailing end. The fishing line passes through the small aperture in the receptacle to engage the sinker which is inserted into the receptacle through the large aperture. A plurality of elongate, flexible, resilient whiskers project outwardly from the leading portion of the receptacle.

The whiskers emanating from the receptacle usually fend the receptacle off of the underwater obstructions. However, if the whiskers do not prevent the receptacle from being snagged, the large size of the receptacle prevents it from being firmly wedged in the obstruction. Usually, the fishing line can be manipulated to free the receptacle from the snag so that the sinker, together with the bait and lure being used, are not lost. In the preferred embodiment of the present invention, the receptacle is constructed of flexible, resilient material so that it can more easily be manually disengaged when snagged on an obstacle.

In the preferred embodiment of the present invention, the leading portion of the receptacle is provided with a plurality of small diameter holes. Each whisker includes an elongate portion and a bulbous portion. The whiskers can be inserted outwardly through the walls of the receptacle, and the bulbous portions of the whiskers prevent them from becoming disengaged from the receptacle. This construction allows the apparatus of the present invention to be rapidly and easily constructed at a very low cost. It is also contemplated that the whiskers can be formed as an integral part of the receptacle itself.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view illustrating use of the apparatus of the present invention;

FIG. 2 is an elevation view of the apparatus of the present invention;

FIG. 3 is a section view taken along lines 3—3 of FIG. 2;

FIG. 4 is an elevation view taken along lines 4—4 of FIG. 2.

DESCRIPTION OF THE PREFERRED EMBODIMENT

The manner in which the apparatus 10 of the present invention is used to prevent snagging of a sinker is illustrated by way of reference to FIG. 1. The sinker is located on the end of a fishing line 12 being retrieved by fisherman 14. A pair of hooks 16, 17 including either a lure or bait are attached to fishing line 12 above the sinker. As fishing line 12 is retrieved, the sinker within apparatus 10 of the present invention is dragged along the bottom 18 of lake or stream 20. The whiskers 22 of apparatus 10 fend the apparatus off of obstructions such as rock 24 and branch 25 so that the sinker does not become snagged as it is dragged along the bottom.

Apparatus 10 of the present invention is illustrated in more detail by way of reference to FIGS. 2-4. The apparatus includes a hollow receptacle 30 which preferably has a generally spherical shape and is constructed of resilient, flexible material. A relatively small aperture 32 is provided in the leading portion of receptacle 30, and a large diameter aperture 34 is provided in the trailing portion. Sinker 36 can be inserted through aperture 34 to the interior of receptacle 30. Various size sinkers can be used interchangeably, but in any event the cross-section of receptacle 30 is much larger than that of the sinker. Sinker 36 is attached to fishing line 12 which enters receptacle 30 through aperture 32. As a result, when fishing line 12 is retrieved, sinker 36 together with surrounding receptacle 30 is pulled through the water. Large diameter air holes 37 allow the air to emerge from receptacle 30 and the weight of sinker 36 causes the sinker and receptacle to be dragged along the bottom 18 of the water 20.

A plurality of relatively small diameter holes such as 38 are provided in receptacle 30. Each whisker 22 includes an elongate, resilient, flexible portion projecting outwardly through each aperture 38, and a bulbous portion 40. Whiskers 22 are inserted outwardly through apertures 38 until bulbous portion 40 is engaged so that the whiskers are fixed to the receptacle. Friction between the whiskers and apertures 38 maintain them in position. Accordingly, when receptacle 30 is dragged through the water surrounding sinker 36, whiskers 22 will fend the receptacle off most obstacles. Even when receptacle 30 is snagged on an obstacle, its large diameter and flexible construction allow it to be readily disengaged from the obstructions.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. Apparatus for reducing the likelihood that a weighting device on a fishing line will become snagged on underwater obstructions, said apparatus comprising:
   a hollow receptacle having a cross-section substantially larger than the cross-section of said weighting device, said receptacle having a leading portion including a relatively small aperture and a trailing portion having a relatively larger aperture for providing access to the interior of said hollow receptacle for said weighting device, the fishing line being adapted to pass through the small aperture to engage the weighting device when inserted through the large aperture; and
   a plurality of elongate, substantially linear, flexible, resilient whiskers projecting outwardly from the leading portion of said receptacle and adapted to fend the receptacle off the underwater obstructions, the size of the receptacle further serving to prevent the weighting device from being snagged on such obstructions.

2. Apparatus as recited in claim 1 wherein the hollow receptacle is constructed of flexible, resilient material.

3. Apparatus as recited in claim 1 wherein the receptacle has a generally spherical configuration.

4. Apparatus as recited in claim 1 wherein the leading portion of the hollow receptacle includes a plurality of small diameter whisker receiving apertures, and wherein each of the whiskers include an elongate portion and a bulbous portion, each of said whiskers projecting outwardly through one of the small diameter whisker receiving apertures with the bulbous portion preventing removel of the whisker from the receptacle.

5. The apparatus of claim 4 wherein said bulbous portion is located adjacent the interior end of the associated whisker.

6. Apparatus as recited in claim 1 wherein the trailing portion of the hollow receptacle includes a plurality of air holes adapted to minimize the formation of air bubbles within the receptacle.

7. Apparatus for reducing the likelihood that a sinker or other weighting device on a fishing line will become snagged on underwater obstructions, said apparatus comprising:
   a generally spherical, hollow receptacle constructed of resilient, flexible material and having a cross-section much larger than the cross-section of the weighting device, said receptacle having a leading portion including a relatively small aperture and a trailing portion having a relatively large aperture, the fishing line adapted to pass through the small aperture and engage the weighting device inserted through the large aperture, said leading portion further including a plurality of small diameter whisker receiving apertures; and
   a plurality of whiskers each having an elongate, flexible portion projecting outwardly through one of the respective small diameter whisker receiving apertures in the receptacle, and a bulbous portion within the receptacle, the bulbous portion of each said whisker preventing removal of the whisker from the hollow receptacle, said whiskers adapted to fend the receptacle off of the underwater obstacles, the size of the receptacle further minimizing the likelihood of the weighting device becoming snagged on such obstructions.

8. The apparatus of claim 1 wherein each of said whiskers is formed integrally with said receptacle.

* * * * *